United States Patent [19]
Keller

[11] 3,754,123
[45] Aug. 21, 1973

[54] APPARATUS FOR ELECTRONICALLY SQUARING AND SUMMING PROJECTIONS OF A VECTOR FOR INSPECTING ARTICLES ON A CONVEYOR

[75] Inventor: Rene Keller, Dietikon, Switzerland

[73] Assignee: Emhart Corporation S.A., Zurich, Switzerland

[22] Filed: Feb. 28, 1972

[21] Appl. No.: 229,868

[52] U.S. Cl. ............ 235/151.3, 235/192, 250/223 R
[51] Int. Cl. .......................... G06g 7/22, G06m 7/00
[58] Field of Search .................... 235/192, 190, 191, 235/185, 189, 193.5, 151.3; 250/220, 223, 209, 208; 209/111.17; 340/146.3

[56] References Cited
UNITED STATES PATENTS

| | | | |
|---|---|---|---|
| 2,927,735 | 3/1960 | Scuitto | 235/192 |
| 3,566,095 | 2/1971 | Schmitz | 235/193.5 X |
| 3,598,978 | 8/1971 | Rempert | 235/151.3 X |
| 3,670,153 | 6/1972 | Rempert | 235/151.3 X |
| 3,671,731 | 6/1972 | Denoncourt et al. | 235/192 |

Primary Examiner—Joseph F. Ruggiero
Attorney—John C. Hilton

[57] ABSTRACT

Two mutually perpendicular light beam patterns are directed across a continuously moving conveyor toward an array of light sensitive devices arranged in pairs for inspecting the silhouette of articles on the conveyor. The leaner inspection circuitry includes a pulse generating and counting means capable of providing two signals indicative of the degree of lean of an article in two mutually perpendicular directions. These signals, or series of pulses, are squared, respectively, and then summed to be compared to some predetermined acceptable range.

3 Claims, 5 Drawing Figures

APPARATUS FOR ELECTRONICALLY SQUARING AND SUMMING PROJECTIONS OF A VECTOR FOR INSPECTING ARTICLES ON A CONVEYOR

BACKGROUND OF INVENTION

Automated machinery is used increasingly for the production of articles in very large series. Frequently, the finished articles then proceed to an automated inspection line for checking the critical dimensions and correct gauging of the articles and rejection of faulty or defect products.

In general, an automated inspection line comprises a conveyor to receive and carry the articles in sequence and in a spaced relationship through a series of inspection stations. In order to inspect or check the shape and the silhouette dimensions of the articles, it is known to use mechanical sensors or light barriers, the latter type being preferred because it provides for inspection without physical contact.

Correct positioning of the articles on the conveyor is a basic requirement for operating an automated inspection line of the type described above. Also, in the production of articles having a rotational symmetry it is usually required that the axes of such articles be in a substantially vertical position relative to a horizontal base, such as the conveyor which normally carries the articles on a horizontal face. U.S. Pat. No. 3,549,890 issued Dec. 22, 1970 to Rene Keller discloses such an arrangement for checking the position and, what is even more important, any "leaner," i.e., inclination of the axis of the rotational symmetry with respect to a vertical line, of the inspected articles. The apparatus disclosed in the said patent comprises two first pairs of light barriers including four light beams in a substantially horizontal and parallel alignment relative to each other. One pair of light beams is arranged above the lower edge or bottom of the inspected article to be tested while the other pair is arranged below its upper edge. The horizontal distance between the two light beams of each pair is smaller than the diameter of the article at the corresponding height, and the difference between the distance of the one pair of light beams and the corresponding diameter of the article exceeds the difference between the distance of the other pair of light beams and the corresponding diameter of the article. Each pair of light beams is connected with an electronic signal generating means. The duration of the signal produced corresponds to the period of time during which both of the light beams of the pair of light barriers are interrupted by a passing article. In view of the above ratio of the light beam distances to the diameters of the inspected article a signal from one pair of light beams is of longer duration than the signal from the other pair. Accordingly, parameter or leaner index can be obtained by comparing the relative time shift or delay of the two signals.

When the inspected article is in a vertical position the shorter signal is exactly at the center of the longer signal. On the other hand, when the inspected article is in an oblique position, that is a leaner, the shorter signal is not at the center of the longer signal but is shifted from the center towards either end of the longer signal. In order to measure the relative shift of the two signals an impulse generating means is provided with an impulse frequency controlled by the travel speed of the inspected articles, i. e., the speed of the conveyor. The longer signal then is used to actuate an electronic gate to feed the impulses produced by said impulse generating means to a counter. The shorter signal is used to reverse the counter. If the tested article is in vertical position the shorter signal reverses the counter in the middle of the longer signal, then the number of the impulses remaining in the counter is Zero at the end of the inspection of the article. If the inspected article has a leaner or inclination relative to a vertical axis the numbers of the impulses counted in and out of the counter are not equal, and a residual number of impulses, either impulses counted in or impulses counted out, remains in the counter at the end of the inspection. The number of residual impulses in an index or parameter indicating the inclination or the leaner of the inspected article.

This method of leaner inspection by means of two light barriers is incapable of indicating leaners or inclinations in the direction of the light beams. To avoid this limitation the device disclosed in the above mentioned U.S. Patent includes two pairs of light barriers in a mutually perpendicular arrangement and intersecting the direction of conveyor movement at an angle of 45°.

Any leaner can be detected with this arrangement regardless of the leaner position relative to the conveyor. However, it is only the leaners in the direction of transport and transverse thereto that are measured at their normal value. In the patent disclosure a measured value is considerd "normal" if it is of equal size for both the first and the second pair of light barriers. The determination of all other leaners is subject to an error, the size of which depends upon the angle between the leaner plane and the light beams used for this determination. Due to such errors a difference may appear between the leaner as measured and the actual leaner. Such an unprecise determination of the leaner of an inspected article is not a satisfactory solution of the technical problem defined above.

Accordingly, it is an object of this invention to avoid the above discussed shortcomings.

SUMMARY OF INVENTION

The apparatus according to the invention for computing the squared value of the length of a vector from the double lengths of the projections of said vector under angles of 45° and 135° onto a straight line is characterized by an oscillator means and two electronic circuits for continued addition, one input of each of said electronic circuits being connected with said oscillator means while a second input of each of said electronic circuits is connected with a device in which a value corresponding to the double length of one of the two vector projections is stored, said device further having an output for supplying a number of impulses corresponding to the square of the value stored in the said device, said apparatus comprising a summing circuit connected with the outputs of said electronic circuits, said summing circuit having an output for supplying the sum of the squared values. Said apparatus may further comprise a division circuit connected with the output of said summing circuit, said division circuit being capable of dividing said sum of said squared values by a constant divisor, and said apparatus further comprising a counter means connected with said division circuit and being capable of receiving the divided sum of said squared values.

When using this novel apparatus according to the invention in combination with a testing device of the type known and disclosed in the above mentioned U.S. Pat.

No. 3,549,890 which is incorporated into this specification by reference, the actual or true leaner of an inspected article can be determined independently from the direction of such leaner.

DETAILED DESCRIPTION

Figure 1:
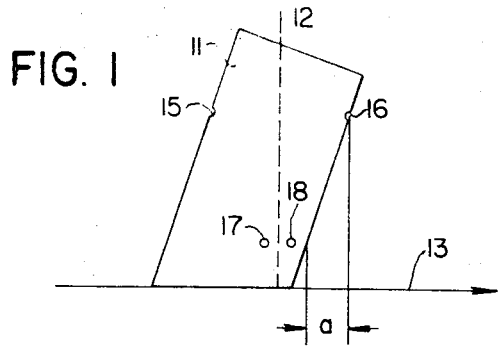
FIG. 1 is a schematic illustration of an inspected article with a leaner relative to the vertical while the article travels between two pairs of light beams.
Figure 2:
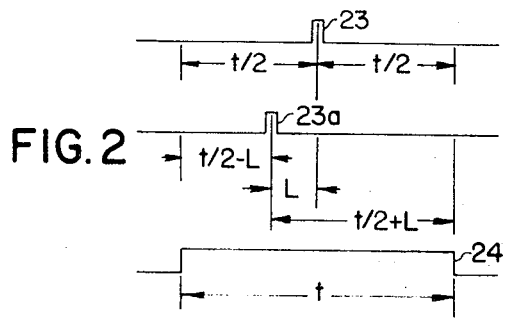
FIG. 2 is a schematic illustration of the signals produced by the two pairs of light beams of FIG. 1 upon passing through the inspected article.

With reference to the drawings, FIG. 1 shows an inspected article 11 moving on a conveyor (not represented in the drawing) in the direction of the arrow 13 and having a leaner relative to vertical 12. Two pairs of light beams are arranged laterally relative to the conveyor such that the light beams indicated at 15, 16, 17 and 18 cross or intersect with the vertical plane of movement of the conveyor. Since each pair of light barriers produces a signal only as long as both of the two corresponding light beams are interrupted by the moving article, and since the distance of the light beams of the one pair in relation to the corresponding diameter of the article is selected differently from the distance of the other pair, the two pairs of light beams generate signals of different duration. Because of the symmetric arrangement of the pairs of light beams relative to each other an article passing and interrupting the light beams produces signals (FIG. 2) such that a shorter signal 23 appears exactly at the center of a longer signal 24 when the inspected article is substantially vertical. When the inspected article, as shown in FIG. 1, has a leaner or inclination relative to the vertical the degree of inclination or leaner between the two pairs of light beams corresponds to a horizontal distance $a$ and the shorter signal will be displaced from the center of the longer signal by the shift L (FIG. 2).

Figure 3:
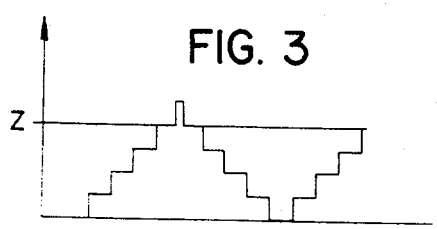
FIG. 3 is a graphic presentation of the counter position produced by signals according to FIG. 2.

In the conventional testing devices of the type discussed above the longer signal 24 controls the impulses fed into a counter. The frequency of the impulses depends upon the speed of movement of article 11. When the shorter signal 23a occurs the counting direction is reversed. Such a counting operation is schematically shown in FIG. 3 for a shorter signal 23a which is shifted from the center of the longer signal 24 by a distance or shift L employing a counter with a self-actuated reversal of the counting direction as soon as the Zero position of the counter is passed. It will be apparent that regardless of the actual degree of inclination of the inspected article the counter position Z at the end of signal 24 corresponds to twice the value of shift L.

Figure 4:
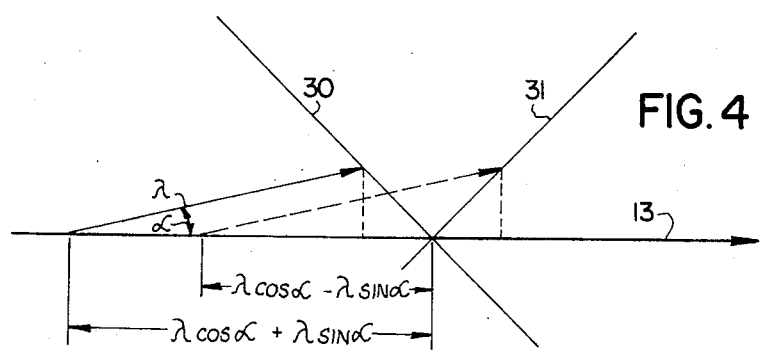
FIG. 4 is an illustration showing the lengths of projections of a vector as a function of the angle between the vector direction and the direction of projection.

For the purpose of the above discussion it was assumed for simplicity of presentation that the leaner of article 11 and, accordingly, its horizontal projection $a$ are positioned in the direction of arrow 13 and transverse to light beams 15, 16, 17 and 18. However, the articles on the conveyor of a test line may have leaners in random directions. In an operative testing device such as disclosed in the above mentioned U.S. Patent more than two pairs of parallel light barriers are provided, e.g., four pairs of light barriers in a crossed or mutually perpendicular arrangement. This is illustrated in FIG. 4 where the arrow 13 represents the transport direction of a conveyor as discussed in connection with FIG. 1, while straight lines 31 and 30 intersecting with arrow 13 at angles of 45° and 135°, respectively, indicate the directions of the light beams of the crossed light barriers.

The horizontal projection of a leaner in a random direction is represented by the vector $\lambda$ which together with the arrow 13 defines an angle $\alpha$. When an inspected article with a leaner is moved through the testing line, this corresponds to, and will be indicated by, a shift of the vector $\lambda$ in the direction of arrow 13 through the light beams positioned in the direction of line 30. In other words, vector $\lambda$ as "seen" by these light barriers has a length of $L_{30} = \lambda \cos \alpha + \lambda \sin \alpha$. To the light barriers having light beams in the direction of line 31 vector $\lambda$ with the same shift appears as having a length $L_{31} = \lambda \cos \alpha - \lambda \sin \alpha$.

Because of the fact that counter position Z corresponds, as discussed above, to twice the amount of the shift L the counter positions for the corresponding light barriers are $$Z_{30} = 2L_{30} = 2 \lambda (\cos \alpha + \sin \alpha)$$

(1)

$$Z_{31} = 2L_{31} = 2 \lambda (\cos \alpha - \sin \alpha)$$

(2)

For computing the true length of projections $\lambda$ from the two counter positions $Z_{30}$ and $Z_{31}$ it is necessary first to eliminate the trigonometric functions. This can be achieved by squaring the two sides of the above equations (1) and (2)

$$(Z_{30})^2 = 4 \lambda^2 (\cos \alpha + \sin \alpha)^2 = 4 \lambda^2 (1 + 2\cos \alpha \cdot \sin \alpha)$$

(3)

$$(Z_{31})^2 = 4 \lambda^2 (\cos \alpha - \sin \alpha)^2 = 4 \lambda^2 (1 - 2\cos \alpha \cdot \sin \alpha)$$

(4)

Upon addition of the two equations (3) and (4) it follows that $$Z_{30}^2 + Z_{31}^2 = 4 \lambda^2 (1 + 1) = 8 \lambda^2$$

(5) or $$\lambda = \sqrt{(Z_{30}^2 + Z_{31}^2)/8}$$

(6)

From either equation (5) or (6) it is apparent that the horizontal projections of a leaner can be computed from the positions of the two counters cooperating with the pairs of light beams and that such computation yields the normal or true leaner independently from the direction of the leaner.

Squaring of the counter positions and dividing of their sum can be effected with relatively simple electronic means while electronically deriving the square root of this sum would require a far more complicated arrangement. Therefore, and in accordance with the invention the leaner is determined from the squared length of the horizontal leaner projection rather than directly from the length of this projection. The computation equation then is $$\lambda^2 = (Z_{30}^2 + z_{31}^2)/8 \tag{7}$$

Figure 5:
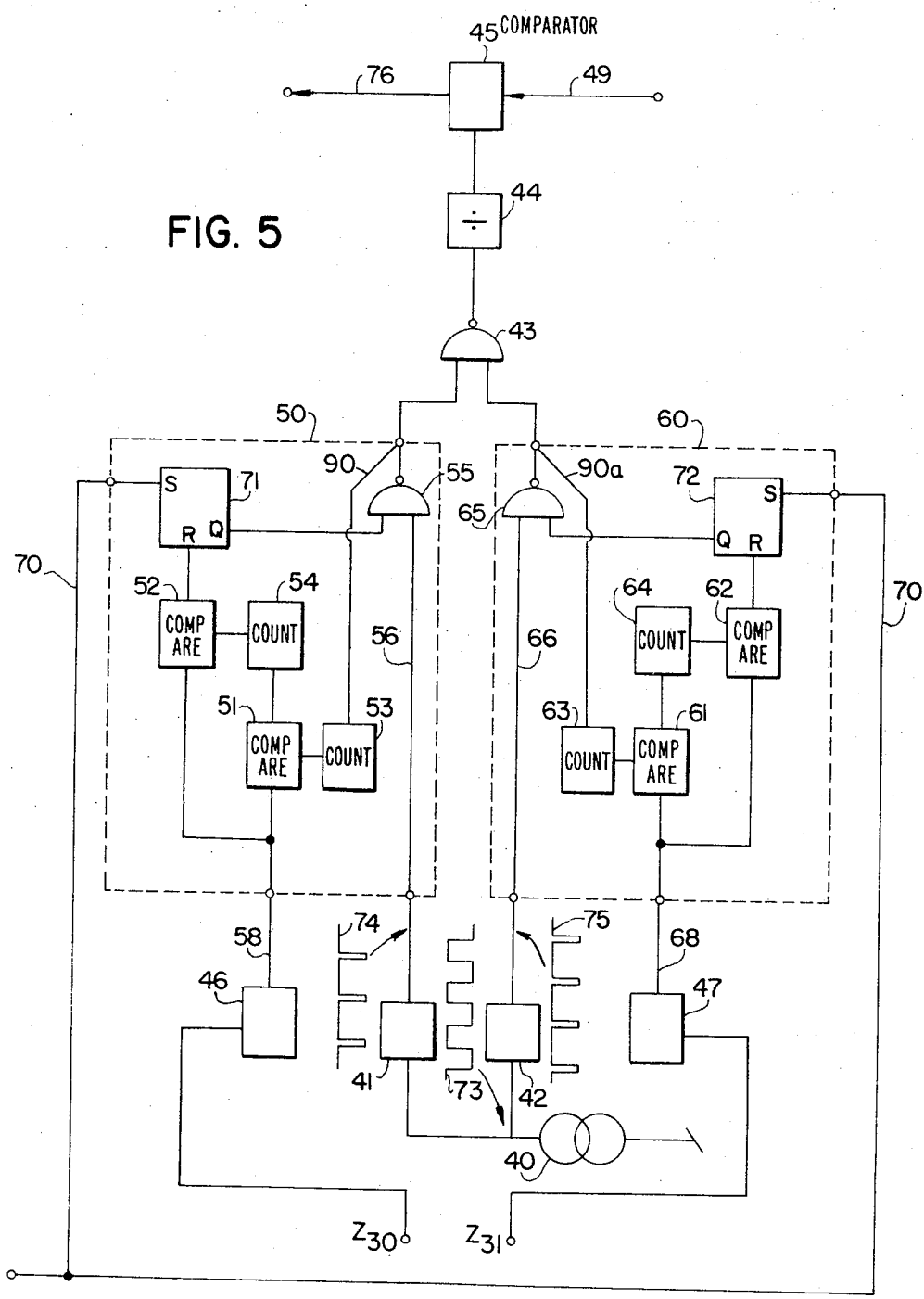
FIG. 5 is a block diagram of a preferred embodiment of the apparatus according to the invention.

FIG. 5 is a block diagram illustration of an embodiment of an apparatus according to the invention capable of computing the above equation. This apparatus comprises an oscillator 40, the output of which is connected with the inputs of two differentiating networks 41 and 42. Two circuits 50 and 60 of essentially the same structure are provided to square a given number. An AND-gate 43 serves to sum up the squared values computed by the two circuits. The apparatus further comprises a dividing network 44 for dividing the sum of the squared values by a fixed divisor, and a counter 45 for receiving the result of the computing operation. However, it should be noted that such a dividing step is not required to practice the invention. It will be apparent that the network 44 might also include means for calculating the square root of its input. Each of the two circuits 50 and 60 includes two comparators 51 and 52, and 61 and 62, two counters 53 and 54 and 63 and 64, a bistable flip flip 71 and 72, as well as a gate circuit 55 and 65, all connected as indicated in FIG. 5.

To operate the apparatus for computing the squared value of the true length of the horizontal projection of the leaner of an article, counters 46 and 47, each containing one of the numbers to be squared, are connected respectively with the second inputs 58 and 68. Provision is made in the counter 45 to obtain a signal output whenever a present number value is reached. This signal then indicates that the leaner has exceeded the permissible value.

In the operation of the inventive apparatus a testing device of the type known per se and disclosed, for example, in the above mentioned U.S. Patent, is combined with a testing line which supplies a signal, upon termination of the inspection of an article, through line 70 to set the bistable flip flops 71 and 72 which in turn open the AND gates 55 and 65. The oscillator generates an impulse sequence 73 in which the width of the impulse preferably is equal to the distance between the subsequent impulses. This impulse sequence is supplied to the differentiating networks 41 and 42. One differentiating network 41 differentiates the leading edge of the impulse while the other differentiating network 42 differentiates the trailing edge. Impulse sequences 74 and 75 then appear at the outputs of the two differentiating networks. These impulses have a symmetric shift in relation to each other. These phase-shifted impulses are counted through AND gates 55 and 65 and thence into 90 into the first counters 53 and 63 respectively of the corresponding circuit 50 and 60, respectively, and simultaneously fed through AND-gate 43 into dividing network 44. The first counters 53 and 63 are compared with the counters 46 and 47 of the testing device by means of comparators 51 and 61. Each comparator supplies an impulse to a second counter 54 and 64, respectively, as soon as the number of the impulses fed into the first counters 53 and 63 corresponds to the counter position of counters 46 and 47 of the apparatus. Each of the second counters 54 and 64 is compared with corresponding counters 46 and 47 of the testing device by means of comparators 52 and 62. As soom as the number of the impulses fed into the second counters 54 and 64, respectively, reaches the counter position of corresponding counters 46 and 47 of the testing device, comparators 52 and 62, respectively, provide signals to the corresponding bistable flip flop circuits 71 and 72 so as to reset them thus closing the gates 55 and 65 preventing further pulses from passing through. Accordingly, gate circuits 55 and 65 remain receptive only to such a number of impulses through lines 56 and 66, respectively, as corresponds to the product of the counter position multiplied by itself, i.e., the squared value of the counter position of the coordinated counters 46 and 47, respectively. As a consequence of the phase shift of the impulses fed into circuits 50 and 60 these two products or squared values can be added simply by means of AND-gate 43 and fed into dividing network 44. For a computation in accordance with above equation (7) the setting of the dividing network is selected such that only every eighth impulse is fed into counter 45. The content of counter 45 then corresponds to the target value, i.e., the squared value of the length of a vector having a random direction.

A detailed description of structure and function of the oscillator, the differentiating network, the electronic counters, the comparators, gate circuits and dividing networks does not appear necessary because such means are well known in the art. Any such means is commercially available, e.g., in form of modules, and can be used for tthe purposes of the invention.

It will be immediately apparent that it is possible, for example, to operate without the differentiating networks 41 and 42 and to feed impulses of identical phase into circuits 50 and 60. In this case, however, a relatively complicated adding circuit must be used instead of the simple AND-gate 43.

In the operation of the apparatus according to the invention as discussed above a comparator value can be fed from the presetting stage through line 49 into counter 45, which comparator value is or can be related to the eight fold sum of the squared values of the two counter positions. In this instance, the apparatus shown in FIG. 5 can be operated without a dividing network 44.

It is understood that the apparatus according to the invention is not limited to the use for computing the leaner of articles conveyed in a test line. Rather, the apparatus can be used for computing any problems which can be reduced to computing the square of the length of a vector from twice the length of the projection of such vector under angles of 45° and 135° onto a straight line.

I claim:

1. An apparatus for inspecting upright articles as they are advanced on a conveyor and comprising in combination two angularly related arrays of light responsive means mounted respectively on opposite sides of the conveyor, means for directing a plurality of light beams toward said light responsive means, first pairs of light responsive means in said respective arrays disposed adjacent the surface of the conveyor, each of said first pairs being horizontally spaced from one another a distance significantly less than the corresponding dimension of the base portion of an upright article, pulse generating means operable in timed relationship to the speed of the conveyor for producing pulses proportional in frequency to the speed of the conveyor, counters associated with the outputs of said first pairs of light responsive means for recording the pulses produced during the outputs of said light responsive means, second pairs of light responsive means in said respective arrays and disposed above the first pairs at a spacing only slightly less than the corresponding dimension of an upper portion of an upright article, means for reversing said respective counters in response to the outputs of corresponding second pairs of light responsive means, discrete comparator means for producing output "count" signals having two series of pulses, respectively, proportional in number to the degree of lean of the inspected articles but being unrelated in timed relationship to one another except as representing inspection of a single article, circuit means for squaring the number of pulses in each series, and a summing circuit for adding said squared numbers of pulses.

2. The apparatus of claim 1 further characterized by a "divide-by" circuit for producing a quotient pulse count in response to the output of said summing circuit.

3. The apparatus of claim 1 further characterized by a comparator-counter which is preset with a total count of predetermined number, and which comparator-counter produces a reject signal when the output of said summing circuit exceeds the preset total count.

* * * * *